United States Patent
Early et al.

(10) Patent No.: US 10,422,410 B2
(45) Date of Patent: Sep. 24, 2019

(54) CARRIER FOR A FLYWHEEL

(71) Applicant: Flybrid Automotive Limited, Lancashire (GB)

(72) Inventors: Andrew Early, Oxfordshire (GB); Daniel R. Jones, Buckinghamshire (GB); Tobias Knichel, Oxfordshire (GB)

(73) Assignee: Punch Flybrid Limited, Northampton (GB)

( * ) Notice: Subject to any disclaimer, the term of this patent is extended or adjusted under 35 U.S.C. 154(b) by 0 days.

(21) Appl. No.: 15/549,403

(22) PCT Filed: Feb. 10, 2016

(86) PCT No.: PCT/GB2016/050314
§ 371 (c)(1),
(2) Date: Aug. 8, 2017

(87) PCT Pub. No.: WO2016/128743
PCT Pub. Date: Aug. 18, 2016

(65) Prior Publication Data
US 2018/0023661 A1    Jan. 25, 2018

(30) Foreign Application Priority Data
Feb. 11, 2015  (GB) .................................. 1502252.8

(51) Int. Cl.
*F16J 15/00* (2006.01)
*F16F 15/315* (2006.01)
(Continued)

(52) U.S. Cl.
CPC ........ *F16F 15/3156* (2013.01); *F16C 27/066* (2013.01); *F16C 35/077* (2013.01);
(Continued)

(58) Field of Classification Search
CPC .. F16F 15/315; F16F 15/3156; F16F 2230/30; F16J 15/002; F16J 15/3232; F16J 15/3236
See application file for complete search history.

(56) References Cited

U.S. PATENT DOCUMENTS 5,509,667 A * 4/1996 Klein .................... F16C 27/066
                                                     277/565
9,300,184 B2    3/2016 Cross
(Continued)

FOREIGN PATENT DOCUMENTS

| EP | 2142827 A1 | 1/2010 |
|---|---|---|
| GB | 2489021 | 9/2012 |
| WO | 2008135707 | 11/2008 |

*Primary Examiner* — Jeremy R Severson
(74) *Attorney, Agent, or Firm* — McCracken & Gillen LLC

(57) ABSTRACT

The present invention relates to a flywheel apparatus for energy storage and recovery including a housing within which there is a chamber in which a flywheel on a shaft rotates. The chamber is evacuated to at or near vacuum pressure, so that air resistance-related energy losses of the flywheel as it rotates are reduced. Maintaining near-vacuum pressure within the chamber requires an effective seal between the housing and the shaft. The effective seal must be maintained despite any relative movement (in particular translational movement) of the flywheel and the housing. To this end, the shaft is mounted via a bearing arrangement on a carrier on which is also mounted a sealing arrangement. The carrier is mounted on the housing such that the carrier, the bearing arrangement and the sealing arrangement move substantially together relative to the housing.

20 Claims, 3 Drawing Sheets

(51) Int. Cl.
    *F16C 35/077*    (2006.01)
    *F16C 27/06*    (2006.01)
    *F16J 15/40*    (2006.01)
    *F16J 15/324*    (2016.01)
    *F16C 19/54*    (2006.01)
    *F16C 23/08*    (2006.01)

(52) U.S. Cl.
    CPC ........... *F16J 15/002* (2013.01); *F16J 15/324* (2013.01); *F16J 15/40* (2013.01); *F16C 19/543* (2013.01); *F16C 23/08* (2013.01); *F16C 2361/55* (2013.01); *F16F 2230/30* (2013.01); *Y02E 60/16* (2013.01)

(56) References Cited

U.S. PATENT DOCUMENTS

| | | | |
|---|---|---|---|
| 2005/0045439 A1* | 3/2005 | Nishiyama | F16F 9/12 188/290 |
| 2011/0232415 A1* | 9/2011 | Early | F16F 15/3156 74/572.1 |
| 2012/0261536 A1 | 10/2012 | McArthur et al. | |
| 2013/0284459 A1* | 10/2013 | Weintraub | E21B 3/02 166/380 |
| 2014/0033859 A1* | 2/2014 | Hilton | F16C 27/066 74/572.21 |
| 2014/0331817 A1* | 11/2014 | Hilton | B60K 6/105 74/572.21 |

\* cited by examiner

CARRIER FOR A FLYWHEEL

FIELD OF THE INVENTION

The invention relates to a carrier included in flywheel apparatus for energy storage and recovery. In particular, it relates to a carrier on which a bearing arrangement and a sealing arrangement are mounted.

BACKGROUND OF THE INVENTION

A flywheel for energy storage and recovery is typically mounted on a shaft in a housing such that the flywheel and the shaft move substantially together. The shaft is mounted on the housing via a bearing arrangement which allows the shaft (and thus the flywheel) to rotate relative to the housing. Kinetic energy can be stored in the flywheel by increasing the flywheel's speed of rotation. Energy can be recovered from the flywheel by transferring the flywheel's rotational energy to another entity, such as a vehicle drive shaft.

A flywheel which rotates at high speeds (e.g. speeds in excess of 15,000 rpm or 20,000 rpm) experiences large air resistance (or 'windage') forces, because of the high tip speed of the flywheel. This leads to loss of kinetic energy from the flywheel. To reduce such losses, a vacuum pump may be used to at least partially evacuate a chamber within the housing, the flywheel being positioned within the chamber. Evacuating the chamber lowers the pressure within the chamber, optimally to approximately a vacuum level, meaning that the flywheel experiences less air resistance as it rotates in the chamber.

In order for the chamber within the housing to be evacuated and the pressure within the chamber to be maintained at a low level, a seal must be provided between the walls of the housing and the shaft, to prevent (or at least reduce) ingress of fluids such as air or bearing lubricant into the evacuated chamber. The seal must remain effective even when the shaft is rotating at high speed relative to the housing. However, the seal should introduce as little resistance to rotation of the flywheel (e.g. through friction between the seal and the shaft) as possible or the benefit of evacuating the chamber will be lost.

The flywheel and the housing may in some circumstances undergo translational movement relative to one another (in addition to the intended rotational movement relative to each other). Translational movement of the flywheel and the housing relative to each other may include, for example, vibrational motion of the flywheel and the shaft within the housing.

Relative translational motion of the flywheel and the housing can be problematic for several reasons. Firstly, translational movement of the shaft relative to the housing makes it difficult to maintain a seal between the shaft and the walls of the housing, meaning that fluids such as air and oil can pass the seal and enter the evacuated chamber, raising the pressure within the chamber. Secondly, translational motion (e.g. vibration) of the flywheel and the shaft within the housing may cause translational motion (e.g. vibration) of the housing itself relative to whatever body the housing is mounted on or in. Vibration can be loud and/or physically unsettling, and therefore unpleasant for users of the flywheel apparatus. It can also have undesirable consequences if parts of the flywheel and/or the housing come loose due to the vibration. These problems may be particularly bad if one or more of the vibrating bodies achieves a resonant mode of vibration.

The invention aims to overcome or at least ameliorate the problems discussed above.

SUMMARY OF THE INVENTION

Accordingly, there is provided an apparatus comprising: a flywheel mounted on a shaft; a housing for housing the flywheel; a first carrier; a bearing arrangement; and a sealing arrangement, wherein the bearing arrangement and the sealing arrangement are mounted on the first carrier; the shaft is mounted on the first carrier via the bearing arrangement; the sealing arrangement forms a seal against the shaft; and the first carrier is mounted on the housing; wherein the carrier, the sealing arrangement and the bearing arrangement are arranged to move substantially together, relative to the housing, in a radial direction and/or in a direction parallel to the axis of the shaft Advantageously, this may allow the sealing arrangement to maintain a seal against the shaft during relative translational motion of the flywheel and the housing.

The bearing arrangement may include one or more bearings, each bearing including an inner race, an outer race, and a rolling element positioned between the inner and outer races.

The sealing arrangement may include two seals which contact or nearly contact the shaft, and a cavity defined in part by the seals. The cavity may extend circumferentially around the shaft. The cavity may be at least partially filled with sealing fluid and the seals may be configured to retain the sealing fluid within the cavity. The sealing arrangement may form a hermetic seal against the shaft.

The bearing arrangement and the sealing arrangement may be mounted on the first carrier adjacent to one another. The bearing arrangement and the sealing arrangement may be arranged such that the sealing arrangement is closer to the flywheel along the axis of the shaft than the bearing arrangement is.

In some embodiments, the first carrier, the bearing arrangement and the sealing arrangement may be arranged to move substantially together with the shaft. This may allow the sealing arrangement to maintain a seal against the shaft (i.e. to maintain a seal between the first carrier and the shaft), even during relative translational movement of the flywheel and the housing.

The apparatus may be arranged such that relative movement of the housing and the flywheel causes the movement of the first carrier, the bearing arrangement and the sealing arrangement relative to the housing.

The apparatus may be arranged to allow movement of the first carrier, the bearing arrangement and the sealing arrangement relative to the housing in a direction along a radial line of the shaft. In some embodiments, the apparatus may be arranged to allow movement of the first carrier, the bearing arrangement and the sealing arrangement relative to the housing in a direction substantially parallel to a longitudinal axis of the shaft.

The apparatus may additionally comprise a first damper for damping relative movement of the housing and the flywheel. In some embodiments, the first carrier may be mounted on the housing via the first damper. The first damper may be arranged to damp relative movement of the housing and the first carrier, the bearing arrangement and the sealing arrangement. In some embodiments, the first damper may be arranged to damp relative movement, in a direction along a radial line of the shaft, of the housing and the flywheel. In some embodiments, the first damper may be arranged to damp relative movement in a direction substantially parallel to a longitudinal axis of the shaft of the housing and the flywheel.

In some embodiments, the first damper may comprise an elastomeric damper. In some embodiments, the first damper may comprise a ring. The axis of the ring may be substantially parallel to the axis of the shaft. In some embodiments, the first damper may be approximately circular in radial cross section.

The apparatus may additionally comprise a second damper for damping relative movement of the flywheel and the housing.

The apparatus may comprise a second carrier, the second carrier being separated axially from the first carrier, on an opposite side of the flywheel. In some such embodiments, the first carrier and the second carrier may each be provided with at least one damper for damping relative movement of the flywheel and the housing in a direction along a radial line of the shaft, and the second carrier may additionally be provided with at least one damper for damping relative movement of the flywheel and the housing in a direction substantially parallel to the axis of the shaft.

The flywheel may be configured to rotate at speeds of 15,000 rpm or higher.

The sealing arrangement may be arranged to enable a vacuum to be maintained within the housing.

In some embodiments, a further sealing arrangement may be provided between the carrier and the housing. The further sealing arrangement may be a static sealing arrangement. The further sealing arrangement may be formed from an elastomeric material. The further sealing arrangement may also damp the relative movement of the flywheel and housing.

The sealing arrangement may be arranged to maintain a pressure difference of approximately 1 atmosphere between its two sides. Additionally or alternatively, the further sealing arrangement may be arranged to maintain a pressure difference of approximately 1 atmosphere between its two sides.

The apparatus may further comprise at least one flywheel contact surface and at least one housing contact surface, wherein the allowable movement of the carrier relative to the housing in a radial direction with respect to the shaft axis is less than the radial clearance between the flywheel contact surface and the housing contact surface.

The apparatus may further comprise at least one flywheel contact surface and at least one housing contact surface, wherein the allowable movement of the carrier relative to the housing in an axial direction with respect to the shaft axis is less than the axial clearance between the flywheel contact surface and the housing contact surface.

BRIEF DESCRIPTION OF THE DRAWINGS

Specific embodiments of the invention will now be described by way of non-limiting examples, in which.

DETAILED DESCRIPTION OF THE INVENTION

Figure 1:
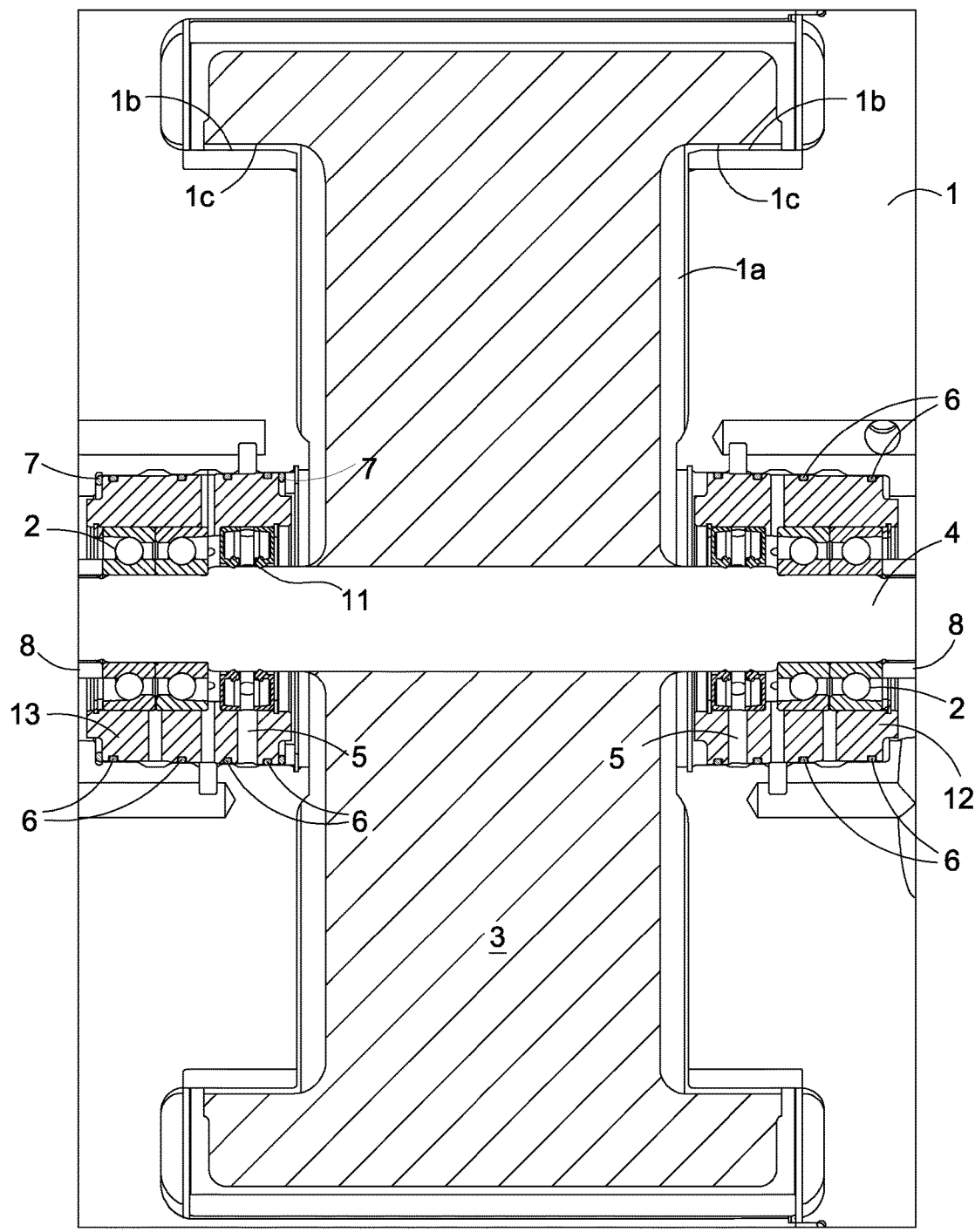
FIG. 1 schematically illustrates in cross section a flywheel apparatus according to an embodiment of the invention.

The present embodiments represent the best ways currently known to the applicant of putting the invention into practice, but they are not the only ways in which this can be achieved. They are illustrated, and they will now be described, by way of example only.

With reference to FIGS. 1 to 4, a flywheel 3 is mounted on a shaft 4 in a housing 1. The housing 1 includes a contact surface 1b which is arranged to reduce the speed of rotation of the flywheel 3 if the flywheel 3 comes into contact with the contact surface 1b, e.g. if a component such as the shaft 4 or a bearing arrangement which supports the flywheel 3 fails, causing the flywheel 3 to deviate significantly from its intended position relative to the housing 1.

The intended position of the flywheel 3 relative to the housing 1 may allow for an intended clearance or intended clearances in a radial direction (a direction along a radial line of the shaft 4) between a contact surface 1c of the flywheel 3 and the contact surface 1b of the housing 1. The intended clearance(s) between the contact surface 1c of the flywheel 3 and the contact surface 1b of the housing 1 may allow for some relative radial movement of the flywheel 3 and the housing 1, as will be discussed in more detail below. The contact surface 1c of the flywheel 3 may be its outermost cylindrical surface, but is preferably one or more radial cylindrical surfaces on an internal diameter of the flywheel 3.

The intended position of the flywheel 3 relative to the housing 1 may also allow for an intended clearance or intended clearances in an axial direction (a direction substantially parallel to the longitudinal axis of the shaft 4) between a surface of the flywheel 3 and an additional or alternative contact surface of the housing 1. Such a contact surface of the flywheel 3 is preferably an axial face of the flywheel 3.

The flywheel 3 is mounted on the shaft 4 such that the flywheel 3 and the shaft 4 can move (in particular, rotate) substantially together, as one mass. The shaft 4 may be a separate component from the flywheel 3, or may be integrally formed with the flywheel 3. The flywheel 3 may have any number of spokes. For example, in some embodiments the flywheel 3 may have one continuous 'spoke' extending all the way round the flywheel 3, while in other embodiments the flywheel 3 has multiple spokes separated from one another around the circumference of the flywheel 3. The flywheel 3 may, in some examples, have five or six spokes distributed around the circumference of the flywheel 3.

The shaft 4 passes through an aperture of a first carrier 12. The shaft 4 is mounted on the first carrier 12 via a bearing arrangement. The bearing arrangement includes two bearings 2, each bearing 2 including an inner race 2a (radially closest to the shaft 4 in FIG. 1), an outer race 2b (radially furthest from the shaft 4 in FIG. 1) and a rolling element 2c positioned between the inner race 2a and the outer race 2b. The bearings 2 may be angular contact bearings or other types of bearing.

The bearing arrangement is mounted on the first carrier 12. The bearing arrangement may be constrained axially (i.e. in a direction along a line parallel to the axis of the shaft 4), relative to the first carrier 12, by at least one retaining ring (such as a snap ring or circlip) and at least one shoulder of the first carrier 12. The retaining ring, the bearing arrangement, and the shoulder of the first carrier 12 may be arranged such that a small degree of relative axial movement of the bearing arrangement and the first carrier 12 is allowed, as explained in more detail below.

In the illustrated embodiment, the flywheel-side of the outer race 2b of the bearing 2 closest to the flywheel 3 is positioned close to a shoulder of the first carrier 12. The outer-side (relative to the flywheel 3) of the outer race 2b of the bearing 2 furthest from the flywheel 3 is positioned close to a retaining ring (such as a circlip with a shim). The retaining ring (e.g. circlip) may apply a force to the outer race 2b of the bearing 2 furthest from the flywheel 3 to urge the outer race 2b towards the outer race 2b of the bearing 2 closest to the flywheel 3, and thus to urge both outer races 2b towards the shoulder of the first carrier 12 and keep the outer races 2b of the bearings 2 substantially axially fixed relative to the first carrier 12. The relative positions of the shoulder of the first carrier 12, the circlip and the bearings 2 permit only a small degree of relative axial movement of the bearing arrangement and the first carrier 12.

Thus the bearing arrangement and the first carrier 12 are constrained, by the retaining ring (e.g. circlip) and by the shoulder of the first carrier 12, to move axially substantially together. The bearing arrangement and first carrier 12 cannot move axially relative to one another (or can only move a small axial distance relative to one another, since the retaining ring permits a small degree of relative axial movement). The bearing arrangement can only move a substantial distance axially if the first carrier 12 moves a substantial distance axially.

In some embodiments, additional components of the flywheel apparatus may contribute to fixing the bearing arrangement and the first carrier 12 axially relative to each other. There may, for instance, be one or more additional retaining rings, one or more lock-nuts, one or more tab washers, and/or one or more split pins to keep the bearing arrangement and the first carrier 12 fixed in the axial direction relative to each other. One or more of these additional components may act to keep inner races 2a and first carrier 12 axially fixed relative to each other, and/or one or more of the additional components may act to keep outer races 2b and first carrier 12 axially fixed relative to each other. Alternatively or additionally, one or more of the additional components may act directly on inner races 2a and outer races 2b to keep inner races 2a, outer races 2b and first carrier 12 axially fixed relative to each other.

A sealing arrangement 11 is also mounted on the first carrier 12. The sealing arrangement 11 includes two seals 10 which contact or nearly contact the shaft 4 and which are positioned slightly apart from one another along the axis of the shaft 4, so that the two seals 10 face each other and a cavity is provided between the seals 10 along the axis of the shaft 4.

In the illustrated examples, the seals 10 are lip seals, though other types of seals may be used. The seals 10 may be polymeric seals such as polyimide seals or rubber seals. The seals 10 may include polytetrafluoroethylene (PTFE), graphite, molybdenum disulphide and/or other materials. In some examples, the seals 10 may be magnetic liquid rotary seals or mechanical face or shaft seals. The seals 10 substantially contact the shaft 4, so that the seals 10 seal against the shaft 4. The sealing arrangement 11 is substantially fixed axially, relative to the first carrier 12, by a further retaining ring (e.g. snap ring or circlip) and a further shoulder of the first carrier 12. Thus the sealing arrangement 11 is constrained to move axially with the first carrier 12. The sealing arrangement 11 cannot move axially relative to the first carrier 12. The sealing arrangement 11 can only move axially if the first carrier 12 moves axially (subject to a small degree of relative movement permitted by the further retaining ring). The outer surface of the sealing arrangement 11 is an interference fit with, and forms a seal with, the internal surface of first carrier 12.

The bearing arrangement is fixed axially, relative to the shaft 4, by a shoulder 9 of the shaft 4 against which one side of one of the bearing arrangement abuts and a retaining nut 8 against which the other side of the bearing arrangement abuts.

In the illustrated example, the bearing arrangement is pre-loaded by the retaining nut 8 in the following way. The retaining nut 8 applies a force to the inner race 2a of the bearing 2 furthest from the flywheel 3 to urge the inner race 2a towards the flywheel 3. The inner race 2a urges the outer race 2b of the bearing 2 furthest from the flywheel 3 (via the corresponding rolling element 2c between the inner race 2a and the outer race 2b) towards the flywheel 3. The outer race 2b of the bearing 2 furthest from the flywheel 3 urges the outer race 2b of the bearing 2 closest to the flywheel 3 towards the flywheel 3, and the outer race 2b of the bearing 2 closest to the flywheel 3 in turn urges its inner race 2a (via the corresponding rolling element 2c) towards the flywheel 3 and against the shoulder 9.

Thus the outer races 2b of the two bearings 2 abut one another under the action of the nut 8 (which abuts the axially outer, radially inner race 2a) and the shoulder 9 (which abuts the axially inner, radially inner race 2a). The radially inner races 2a may or may not abut each other. In some examples, there may be a separating element between the radially inner races 2a. In other examples, there may not be such a separating element. This configuration may keep the bearing arrangement and the shaft 4 substantially fixed axially relative to each other.

Thus, because the bearing arrangement and the shaft 4 are fixed axially relative to one another and the first carrier 12 and the bearing arrangement are fixed axially relative to one another (subject to the small degree of movement permitted by the circlip and radially outer shoulder, described above), the first carrier 12 and the shaft 4 are fixed axially relative to each other. As a consequence, the first carrier 12 is constrained to move axially with the shaft 4. The first carrier 12 cannot move axially relative to the shaft 4. The first carrier 12 can only move axially if the shaft 4 moves axially. The bearing races 2a, 2b are a close sliding fit or an interference fit on the shaft 4, and within the carrier, such that the first carrier 12 is constrained to move radially with the shaft 4. The first carrier 12 cannot move radially relative to the shaft 4. The first carrier 12 can only move radially if the shaft 4 moves radially.

Other and/or additional means for fastening may be used to ensure that the first carrier 12 is fixed axially relative to the shaft 4. In some examples, means for adjusting the bearing arrangement is also included.

As discussed above, a cavity is defined between the seals 10. The seals 10 define the axial boundaries of the cavity, i.e. the seals 10 define how far along a line parallel to the axis of the shaft 4 the cavity extends. The shaft 4 defines an inner radial boundary of the cavity, i.e. the shaft 4 demarcates the inner boundary of the cavity in a radial direction of the shaft 4. A circumferential wall (e.g. a wall of the first carrier 12) defines an outer radial boundary of the cavity, i.e. the circumferential wall demarcates the outer boundary of the cavity in the radial direction of the shaft 4.

The seals 10 and the cavity extend circumferentially around the shaft 4, so that they encircle the shaft. The seals 10 and the cavity are positioned and extend in planes roughly orthogonal to the axis of the shaft 4. The cavity is arranged such that it can be at least partially filled with a sealing fluid. The sealing fluid may be any suitable liquid or gas. In the illustrated example, the cavity is filled with an oil that acts as the sealing fluid. The seals 10 are arranged such that they retain the sealing fluid within the cavity, or retain as much of the sealing fluid as possible within the cavity. Any sealing fluid which leaks past seal 10 closest to the flywheel out of the cavity and into the evacuated chamber 1a may be recovered by the vacuum pump which evacuates the chamber 1a. The vacuum pump may scavenge the sealing fluid from, for example, the bottom of the evacuated chamber 1a and return the sealing fluid to a reservoir of sealing fluid.

In some examples, the sealing fluid may be a fluid that is shared between the seals 10 and a drive system coupled to the flywheel, such as a flywheel transmission. The sealing fluid might for instance be a gear oil, an automatic transmission fluid, or a continuously variable transmission fluid such as a traction fluid which may be used in the case of a traction drive.

In some examples, the sealing fluid may be a low-viscosity oil. The oil may for example have a kinematic viscosity of between approximately 5 mm$^2$ s$^{-1}$ and 15 mm$^2$ s$^{-1}$ at a working temperature of the flywheel apparatus. Low-viscosity oil may advantageously reduce drag in the sealing arrangements.

Depending on the geometry of the wall that demarcates the outer radial boundary of the cavity, the cavity may be annular in cross section, with a circular outer radial boundary. In the illustrated example, the cavity is concentric with the shaft 4. However, in other examples, the cavity and the shaft 4 may be eccentric.

The seals 10 in combination with the sealing fluid are arranged to prevent ingress of fluids (e.g. air, lubricant) and other matter into the chamber 1a within the housing 1. The seals 10 and sealing fluid help maintain a low (ideally vacuum) pressure on the flywheel side of the sealing arrangement 11, within the chamber 1a. The sealing arrangement 11 is arranged to maintain a pressure difference of approximately 1 atmosphere between its two sides, i.e. between the flywheel (vacuum) side of the sealing arrangement 11 and the atmosphere side of the sealing arrangement 11. The sealing arrangement 11 may form a hermetic seal against the shaft. A thin layer or film of fluid between a lip of a seal 10 of the sealing arrangement and the shaft 4 may ensure that the hermetic seal is formed.

Sealing arrangement 11 is mounted on the first carrier 12 such that sealing arrangement 11 is adjacent to the bearing arrangement. In the illustrated example, sealing arrangement 11 is mounted on first carrier 12 on the flywheel side of the bearing arrangement, such that the sealing arrangement 11 is closer to the flywheel 3, along the axis of the shaft 4, than the bearing arrangement is. In other examples, the bearing arrangement may be mounted closer to the flywheel 3 than the sealing arrangement 11 is.

Because sealing arrangement 11 and the bearing arrangement are fixedly mounted on the same first carrier 12, any force which causes first carrier 12 to move also causes sealing arrangement 11 and the bearing arrangement to move. Similarly, any force which causes the bearing arrangement to move also causes first carrier 12 and sealing arrangement 11 to move. First carrier 12, the bearing arrangement and sealing arrangement 11 move substantially together. The bearing arrangement and sealing arrangement 11 are mounted on the first carrier 12 for common movement of the bearing arrangement, the sealing arrangement 11 and the first carrier 12.

If forces applied to the shaft 4 cause translational movement of the shaft 4 relative to the housing 1, that movement of the shaft 4 causes corresponding movement, relative to the housing 1, of the bearing arrangement and thus the first carrier 12 and the sealing arrangement 11. The first carrier 12, the bearing arrangement, the sealing arrangement 11 and the shaft 4 all move substantially together as a consequence of the forces applied to the shaft 4.

For instance, if a rotational movement of flywheel 3 and shaft 4 causes the shaft 4 to undergo translational movement (e.g. vibrate) relative to the housing 1, the bearing arrangement, first carrier 12 and sealing arrangement 11 will be caused to undergo corresponding translational movement relative to the housing 1, by virtue of the force applied between the shaft 4 and the bearing arrangement. Because the bearing arrangement and the sealing arrangement 11 are mounted on and fixed relative to the first carrier 12, the first carrier 12, the bearing arrangement and the sealing arrangement 11 move substantially together with the shaft 4. The first carrier 12, bearing arrangement, sealing arrangement 11, shaft 4 and flywheel 3 may all move (e.g. vibrate) substantially together relative to the housing 1.

If forces applied to the first carrier 12 cause movement of the first carrier 12 relative to the housing 1, the movement of the first carrier 12 causes corresponding movement of the bearing arrangement, the sealing arrangement 11 and the shaft 4 relative to the housing 1. The first carrier 12, the bearing arrangement, the sealing arrangement 11 and the shaft 4 all move substantially together as a consequence of the forces applied to the first carrier 12.

For instance, if a force applied to the first carrier 12 by the housing 1 and/or a force applied to the first carrier 12 as a consequence of gravitational acceleration causes the first carrier 12 to undergo translational movement relative to the housing 1, the bearing arrangement, sealing arrangement 11 and shaft 4 will also be caused to undergo corresponding translational movement relative to the housing 1.

The fact that the first carrier 12, the bearing arrangement and the sealing arrangement 11 are arranged such that they all move substantially together with the shaft 4 means that the sealing arrangement 11 is better able to maintain contact with the shaft 4 when the shaft 4 undergoes translational movement relative to the housing 1 and therefore better able to maintain a seal against the shaft 4 during relative translational movement of the shaft 4 and the housing 1.

The sealing arrangement 11 maintaining contact with the shaft 4 and maintaining the seal against the shaft 4 while the shaft 4 undergoes translational movement relative the housing 1 reduces the possibility of fluid (e.g. air, oil) or other matter moving past the sealing arrangement 11 towards the flywheel 3 and raising the pressure in the chamber 1a within the housing 1 (on the flywheel side of the sealing arrangement 11). Keeping the pressure on the flywheel side of the sealing arrangement 11 as low as possible enables the flywheel 3 to rotate within the chamber 1a with minimal air resistance-related energy loss.

Translational movement of the shaft 4 relative to the housing 1 includes, for example, movement of the shaft 4 in an axial direction (i.e. in a direction substantially parallel to the longitudinal axis of the shaft 4), or in a radial direction (i.e. in a direction along a radial line of the shaft 4), and movement in a combination of axial and radial directions, relative to the housing 1.

Translational movement of the shaft 4 relative to the housing 1 does not include rotation of the shaft 4 about its longitudinal axis relative to the housing 1. However, rotation of the shaft 4 about a different axis from its longitudinal axis (i.e. about an axis which is offset from the longitudinal axis of the shaft 4 and/or at an angle to the longitudinal axis of the shaft 4) relative to the housing 1 may give rise to translational movement of at least a part of the shaft 4 relative to the housing 1. In particular, rotation about such an axis may cause translational movement, relative to the housing 1, of a part of the shaft 4 which is mounted via one or more bearings 2 in a bearing arrangement on the first carrier 12, thus causing corresponding translational movement of the bearing arrangement, the first carrier 12 and the sealing arrangement 11.

Rotation about such an axis may cause a rocking movement of the shaft 4 relative to the housing 1. A wide spacing of bearings 2 axially along the shaft 4 may help prevent such a rocking movement. In some embodiments there may therefore be at least one bearing arrangement on one side of the flywheel 3, and at least one other bearing arrangement on the other side of the flywheel 3. In other embodiments, the shaft 4 may be supported in a cantilevered fashion by one or more bearing arrangements on only one axial side of the flywheel 3. In either case, the spacing between supporting bearings 2 may be arranged to be as wide as possible.

The positioning of the bearing arrangement(s) and sealing arrangement(s) 11 relative to each other and to the evacuated chamber 1a can also be varied. For instance, in some embodiments, one bearing arrangement is positioned outside the evacuated chamber 1a (i.e. axially outside a sealing arrangement 11), and another bearing arrangement is positioned inside the evacuated chamber 1a. The bearing arrangement inside the evacuated chamber 1a may be on the same side of the flywheel 3 as the bearing arrangement which is outside the evacuated chamber 1a, or may be on the opposite side of the flywheel 3.

In some embodiments, such as the embodiment illustrated in FIG. 1, a flywheel apparatus may include at least one damper 6, 7 for damping or attenuating relative movement, vibration or resonant modes of the housing 1 and/or the flywheel 3. First and second carriers 12, 13 may be mounted on the housing 1 via one or more dampers 6, 7. The dampers 6, 7 may isolate the carriers 12, 13 from the housing 1.

Figure 3:
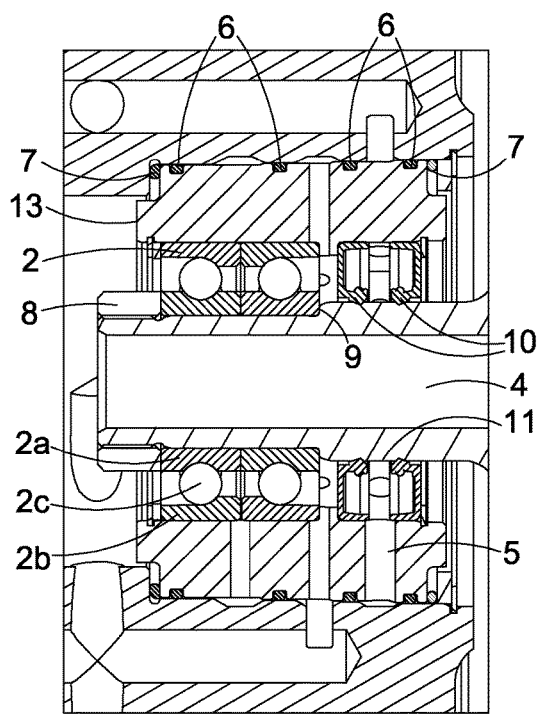
FIG. 3 schematically illustrates in detail a second portion of the cross section of FIG. 1.
Figure 2:
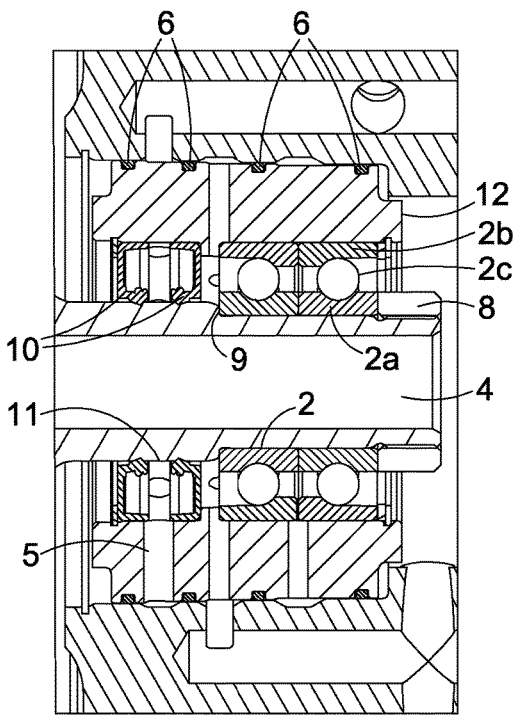
FIG. 2 schematically illustrates in detail a first portion of the cross section of FIG. 1.

In the particular embodiment illustrated in FIG. 1, there are four dampers 6 on the right-hand side of the flywheel 3 (dampers 6 on the right-hand side of FIG. 1, shown in more detail in FIG. 2), for damping relative movement in a radial direction of the flywheel 3 and the housing 1; four dampers 6 on the left-hand side of the flywheel 3 (dampers 6 on the left-hand side of FIG. 1, shown in more detail in FIG. 3), for damping relative movement in a radial direction of the flywheel 3 and the housing 1; and two dampers 7 on the left-hand side of the flywheel 3 for damping relative movement in an axial direction of the flywheel 3 and the housing 1 (dampers 7 on the left-hand side of FIG. 1, shown in more detail in FIG. 3). Other arrangements of dampers, including no dampers, are also possible.

The dampers 6, 7 reduce vibrations of the flywheel 3 and/or housing 1, these typically arising due to vibrational modes of the flywheel and shaft as it rotates at high speed, or due to rapid acceleration of the installed flywheel system (for instance if the flywheel system is installed in a vehicle which is traversing rough terrain). In attenuating such motion or vibration, dampers 6, 7 also increase the allowable relative movement of the flywheel 3 and housing 1. Such increased relative movement may be detrimental to the sealing and durability of the sealing arrangement 11. Constraining the shaft 4 and sealing arrangement 11 to move together thus improves the sealing performance and durability of the sealing arrangement 11.

As illustrated on the right-hand side of FIG. 1 (and in more detail in FIG. 2), the first carrier 12 is mounted on the housing 1 via four dampers 6. The dampers 6 are arranged to damp relative movement, in a direction substantially along a radial line of the shaft 4, of the housing 1 and the first carrier 12. Because the bearings 2 which are mounted on the first carrier 12 are in direct contact with the shaft 4 and the flywheel 3 is mounted on the shaft 4 such that the flywheel 3 and the shaft 4 move substantially together, damping the relative radial movement of the housing 1 and the first carrier 12 damps the relative radial movement of the housing 1 and the flywheel 3.

The dampers 6, which act to damp relative movement of the housing 1 and the flywheel 3 in a direction substantially along a radial line of the shaft 4, may be referred to as 'radial' dampers. The dampers 6 are mounted for radial compression. The dampers 6 may be mounted for shear in planes substantially orthogonal to the axis of the shaft 4. The dampers 6 provide radial restraint to the flywheel 3. The dampers 6 may be configured such that they allow relative radial movement of the flywheel 3 and the housing 1 up to a certain distance. The dampers 6 may for instance allow the flywheel 3 to move a radial distance from its radial equilibrium position relative to the housing 1 (i.e. the radial position relative to the housing 1 to which the flywheel 3 returns when additional external forces are no longer applied to the housing 1 and/or the flywheel 3) which is slightly shorter than the radial distance between a radial contact surface of the flywheel 3 and a radial contact surface of the housing 1 when the flywheel 3 is in its radial equilibrium position (i.e. the intended clearance in the radial direction between the contact surface of the flywheel 3 and the contact surface 1b of the housing 1). This may prevent the flywheel 3 from contacting the housing 1 while the flywheel 3 is rotating under normal conditions, as contact between the housing 1 and the rotating flywheel 3 could lead to significant damage to the flywheel apparatus. However, minimising the clearance between the contact surface of the flywheel 3 and the contact surface 1b of the housing 1 enables effective flywheel containment in the case of a failure of components of the flywheel system (as described earlier).

The carrier or carriers 12, 13 preferably extend in an axial direction from the bearing arrangements (i.e. in a direction parallel to the axis of the shaft 4). The seal between the shaft 4 and sealing arrangement 11 is preferably formed at an inner surface of the sealing arrangement 11 (e.g. at radially inner surfaces of the seals 10 where the seals 10 are in close proximity to the shaft 4); thus frictional power dissipated at the interface between the sealing arrangement 11 and shaft 4 is reduced. Preferably an outer surface of the sealing arrangement 11 forms a seal with the carrier 12, 13. Such a seal may be formed by an interference fit between the outer surface of the sealing arrangement 11 and the internal surface of the carrier 12, 13. In particular, the seal between the outer surface of the sealing arrangement 11 and the internal surface of the carrier 12, 13 may be formed where the seals 10 of the sealing arrangement 11 are pressed as an interference fit into the carrier 12, 13. This seal may be a static seal formed between the sealing arrangement 11 and the carrier 12, 13.

An outer surface of the carrier 12, 13, or a further sealing arrangement in contact therewith, preferably forms a seal with the housing 1. Preferably the carrier or carriers 12, 13 are each radially adjacent to a bearing race that does not rotate with the shaft 4. This race is typically the outer race 2b. The carriers 12, 13 are therefore typically radially outward of the bearing(s) 2 (in particular, radially outward of race(s) 2b), and they do not rotate relative to the housing 1. Thus each carrier 12, 13 is preferably of annular form, and positioned between (i) the sealing arrangement 11/bearing arrangement (which are radially inward of the carrier 12, 13 with respect to the shaft 4 axis), and (ii) the housing 1.

Figure 4:
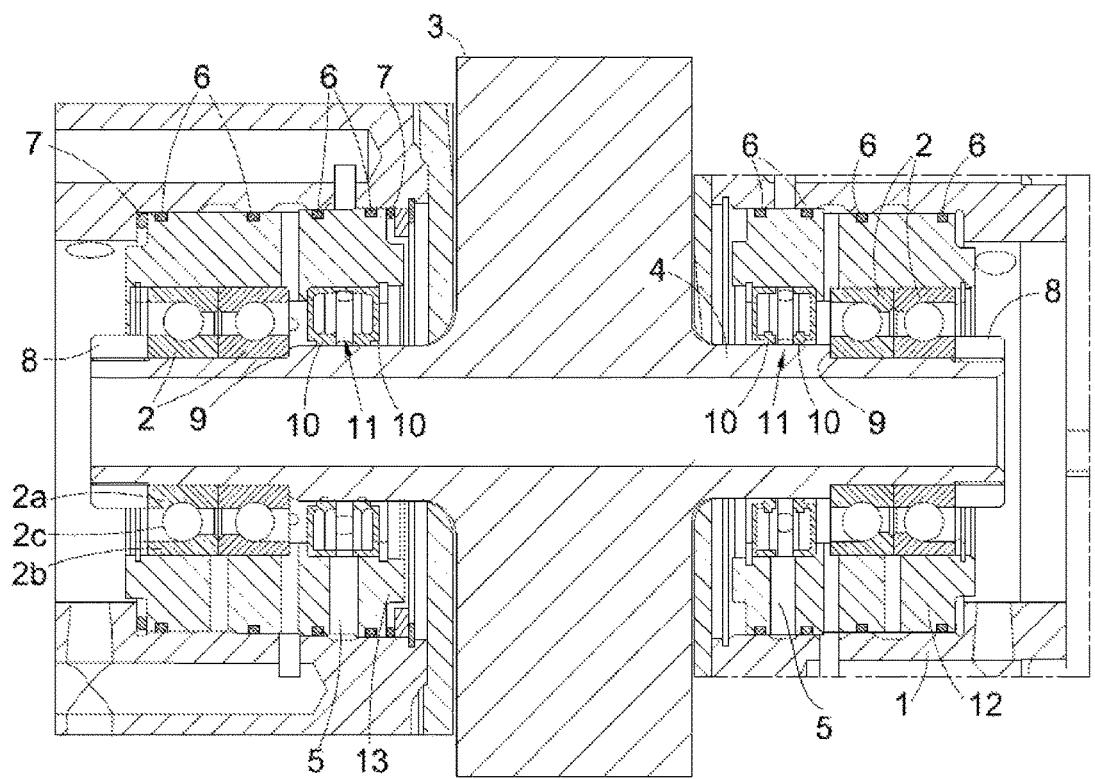
FIG. 4 schematically illustrates in partial cross section a flywheel apparatus according to an embodiment of the invention.

As illustrated on the left-hand sides of FIGS. 1 and 4 (and in more detail in FIG. 3), shaft 4 passes through a second carrier 13. The second carrier 13 is separated axially (i.e. along the axis of the shaft 4) from the first carrier 12. The second carrier 13 is mounted on the housing 1 on the opposite side of the flywheel 3 from the first carrier 12. The second carrier 13 is mounted on the housing 1 via further 'radial' dampers 6. The further radial dampers 6, analogously to the dampers 6 via which the first carrier 12 is mounted on the housing 1 (on the right-hand side of FIG. 1), are arranged to damp relative motion, in a direction along a radial line of the shaft 4, of the housing 1 and the second carrier 13.

Like the first carrier 12, the second carrier 13 has mounted on it a bearing arrangement (including two bearings 2) and a sealing arrangement 11. Like on the first carrier 12, the bearing arrangement and sealing arrangement 11 are mounted on the second carrier 13 such that the sealing arrangement 11 is closer to the flywheel 3 than the bearing arrangement is, i.e. the sealing arrangement 11 is mounted along the axis of the shaft 4 from the bearing arrangement, towards the flywheel 3.

The bearing arrangement and sealing arrangement 11 are mounted on the second carrier 13 such that the bearing arrangement and sealing arrangement 11 are constrained to move axially with the second carrier 13, relative to the housing 1, in the same way that the bearing arrangement and sealing arrangement 11 mounted on first carrier 12 are constrained to move axially with the first carrier 12 relative to the housing 1. The bearing arrangement and sealing arrangement 11 mounted on the second carrier 13 cannot move axially relative to the housing 1 unless the second carrier 13 moves axially relative to the housing 1.

Like the first carrier 12, the second carrier 13 is fixed axially, relative to the shaft 4, by a shoulder 9 of the shaft 4 against which one side of one of the inner races 2a of the bearings 2 in the bearing arrangement abuts; a retaining nut against which one side of another of the inner races 2a of the bearings 2 in the bearing arrangement abuts; and a retaining ring (e.g. circlip) positioned close to an outer race 2b of one of the bearings 2 in the bearing arrangement. The outer race 2b of another of the bearings 2 is positioned close to a shoulder of the second carrier 13 and may apply a force to the second carrier 13, keeping the second carrier 13 fixed axially relative to the bearing arrangement and shaft 4. Thus the second carrier 13 is constrained to move axially with the shaft 4. The second carrier 13 cannot move axially relative to the shaft 4. The second carrier 13 can only move axially if the shaft 4 moves axially (subject to a small degree of movement permitted by the retaining ring). The bearing races 2a, 2b are a close sliding or interference fit on the shaft, and within the carrier, such that the second carrier 13 is constrained to move radially with the shaft 4. The second carrier 13 cannot move radially relative to the shaft 4. The second carrier 13 can only move radially if the shaft 4 moves radially.

As can be seen in FIG. 3, second carrier 13 is also mounted on housing 1 via additional dampers 7. The dampers 7 are arranged to damp relative movement, in a direction substantially parallel to the longitudinal axis of the shaft 4, of the housing 1 and the second carrier 13. Because the second carrier 13, the bearing arrangement and the sealing arrangement 11 are constrained such that they can move axially, relative to the housing 1, only when the shaft 4 moves axially relative to the housing 1, damping the relative axial movement of the housing 1 and the second carrier 13 damps the relative axial movement of the housing 1 and the flywheel 3. The dampers 7, which act to damp relative movement of the housing 1 and the flywheel 3 in a direction substantially parallel to the longitudinal axis of the shaft 4, may be referred to as 'axial' dampers.

The dampers 7 are mounted for axial compression. The dampers 7 may be mounted for shear in planes substantially parallel to the axis of the shaft 4. The dampers 7 provide axial restraint to the flywheel 3. Analogously to dampers 6, dampers 7 may be configured such that they allow relative axial movement of the flywheel 3 and the housing 1 up to a certain distance. The dampers 7 may for instance allow the flywheel 3 to move an axial distance from its axial equilibrium position relative to the housing 1 (i.e. the axial position relative to the housing 1 to which the flywheel 3 returns when additional external forces are no longer applied to the housing 1 and/or the flywheel 3) which is slightly shorter than the axial distance between an axial contact surface of the flywheel 3 and an axial contact surface of the housing 1 when the flywheel 3 is in its axial equilibrium position (i.e. the intended clearance in the axial direction between a contact surface of the flywheel 3 and a contact surface 1b of the housing 1). This may prevent the flywheel 3 from contacting the housing 1 while the flywheel 3 is rotating under normal conditions as contact between the housing 1 and the rotating flywheel 3 could lead to significant damage to the flywheel apparatus. However, minimising the clearance between the contact surface of the flywheel 3 and the contact surface 1b of the housing 1 enables effective flywheel containment in the case of a failure of components of the flywheel system (as described earlier).

In the illustrated embodiment, the first carrier 12 is not provided with axial dampers 7. Relative movement of the first carrier 12 and the housing 1 in the axial direction is not directly damped. Relative movement of the second carrier 13 and the housing 1 in the axial direction is directly damped by the dampers 7 illustrated in FIGS. 1, 3 and 4. Thus, in the illustrated embodiment, the dampers 7 via which the second carrier 13 is mounted on the housing 1 alone damp the relative axial movement of the housing 1 and the flywheel 3.

The first carrier 12 therefore has greater freedom of axial movement (relative to the housing 1) than the second carrier 13 has, since its axial movement is not directly constrained by dampers. The first carrier 12 may be free to float axially within the housing 1, while the second carrier 13 is constrained by the axial dampers 7 which limit the axial movement of the second carrier 13 within the housing 1 and isolate the second carrier 13 from the housing 1.

The greater freedom of axial movement of the first carrier 12 may allow the flywheel apparatus to continue functioning—without applying too much stress to and/or damaging any of the bearing arrangements, sealing arrangements 11 or carriers 12, 13—if, for example, the shaft 4 undergoes thermal expansion during operation of the flywheel apparatus, or the shaft 4 is not manufactured to optimal or intended dimensions. The greater freedom of axial movement of the first carrier 12 may therefore increase the allowable tolerance of certain dimensions of the flywheel apparatus, thereby reducing cost.

The dampers 6, 7 may be made of any suitable material for effecting damping of the relative movement of the housing 1 and the flywheel 3. The dampers 6, 7 may, for instance, include elastomeric material such as natural rubber, a fluorocarbon or polyurethane. Each damper may preferably take the form of a ring, preferably an O-ring, but dampers may also be elastomeric strips or elastomeric pieces. Suitable materials include any elastomeric substance such as a fluorocarbon, polyurethane or a natural rubber. As illustrated in FIGS. 1-4, the carriers 12, 13 are mounted on the housing 1 via dampers 6, 7, such that the dampers 6, 7 are positioned between the carriers 12, 13 and the housing 1. In some examples, one or more carriers 12, 13 may comprise a metalastic bush, comprising a cylindrical metal sleeve with any suitable damping material bonded around its circumference. Such a bush may provide both radial damping via compression of the damping material, and axial damping via shear of the damping material. In the illustrated examples, the dampers 6, 7 are positioned radially outwardly of the bearing arrangements. In other examples, the dampers 6, 7 (and/or metalastic bushes) may be positioned radially inwardly of the bearing arrangements to damp the relative movement of the shaft 4 and the housing 1.

The material, dimensions and other properties of the dampers 6, 7 may be chosen and/or configured to make the rate of damping suitable for the intended application of the flywheel 3 in housing 1, taking into account the magnitudes and directions of the forces that may be applied to the flywheel apparatus to cause relative translational movement of the housing 1 and the flywheel 3. The dampers 6, 7 may be arranged to cause critical damping, under-damping or over-damping of the relative movement of the housing 1 and the flywheel 3.

In particular, depending on the application of the flywheel apparatus, the dampers 6, 7 may be arranged to allow but damp relative axial and/or radial motion of the flywheel 3 and the housing 1, or to prevent relative axial and/or radial motion of the flywheel 3 and the housing 1 altogether. The dampers 6, 7 may be arranged to damp one or more vibrational modes exhibited by the flywheel 3 and/or the housing 1, in particular resonant modes of vibration that are likely to occur in the range of operating speeds of the flywheel 3. The dampers 6, 7 may, for instance, be arranged to damp a rocking mode of the flywheel 3, in which the flywheel 3 rocks on its bearings 2. As discussed above, it may be advantageous for the bearings 2 to be widely separated along the axis of the shaft 4 to reduce the effects of the rocking movement.

In the illustrated examples, the 'radial' dampers 6 are approximately annular, i.e. ring-shaped, in axial cross section. The axes of the dampers 6 extend in directions substantially parallel to the longitudinal axis of the shaft 4. The illustrated dampers 6 extend circumferentially around the carriers 12, 13, and are substantially concentric with the shaft 4. Because they are annular, each of the radial dampers 6 is able to damp radial movement of the shaft 4 relative to the housing 1 in any radial direction.

In other examples, the dampers 6 may have other axial cross sections. The dampers 6 may for instance be elliptical in axial cross section. Alternatively, the dampers 6 may not extend all the way round the exterior surfaces of the carriers 12, 13. The dampers 6 may instead be small pieces (e.g. strips, cuboids, wedges or other shapes) of suitable material, placed between the housing 1 and the first and second carriers 12 at particular points around the shaft 4. In such cases, there may be sufficiently many pieces, i.e. around a sufficiently large percentage of the outer surfaces of the carriers 12, 13, to damp radial movement of the shaft 4 relative to the housing 1 in any radial direction to the desired level. The dampers 6 may include slots or cuts in their material to achieve the desired shape and/or damping properties.

The illustrated radial dampers 6 are approximately circular in radial cross section. The illustrated radial dampers 6 may therefore be O-rings. Advantageously, O-ring dampers 6 may be easier and cheaper to produce and install than dampers of other radial cross-sectional shapes.

In other examples, the radial dampers 6 may have other radial cross-sectional shapes. The radial dampers 6 may, for example, extend in a direction substantially parallel to the axis of the shaft 4, so that the dampers 6 extend axially (as well as circumferentially) along the curved surfaces of imaginary cylinders whose axes are substantially parallel to the axis of the shaft 4.

The radial dampers 6, as well as damping relative radial movement of the shaft 4 and the housing 1, may be arranged to seal one or more of: passages arranged to deliver fluid to and/or from the bearings 2; passages arranged to deliver fluid to and/or from the sealing arrangements 11; and the evacuated chamber 1a by providing a static (non-rotating) seal in the space between the housing 1 and the radially outward surface of the carrier 12, 13. One or more of the oil passages may be sized to provide the required damping of the assembly.

The illustrated 'axial' dampers 7 have a different radial cross-sectional shape from the illustrated radial dampers 6. The illustrated axial dampers 7 extend in directions along radial lines of the shaft 4, so that the dampers 7 extend in planes substantially orthogonal to the axis of the shaft 4. In other examples, the dampers 7 may be circular in radial cross section, like the radial dampers 6 illustrated in FIGS. 1-4, or may have a different cross-sectional profile, such as a square, semi-circle or other shape.

The illustrated axial dampers 7 are spaced apart in a direction parallel to the axis of the shaft 4, such that one axial damper 7 is positioned at each end of the second carrier 13. One of the illustrated axial dampers 7 may be compressed and the other of the illustrated axial dampers 7 may be extended by movement of the second carrier 13 relative to the housing 1 in one direction along a line parallel to the axis of the shaft 4. Movement of the second carrier 13 relative to the housing 1 in the opposite direction along the line parallel to the axis of the shaft 4 may cause the one damper 7 to be extended and the other damper 7 to be compressed. Thus one or both of the axial dampers 7 may contribute to damping and/or constraining relative movement of the second carrier 13 and the housing 1 in a direction parallel to the axis of the shaft 4.

The illustrated axial dampers 7 may be annular in axial cross section, like the illustrated radial dampers 6. Alternatively, the axial dampers 7 may, as discussed above in the context of the radial dampers 6, have other axial cross sections, or comprise multiple pieces (e.g. strips, cuboids, wedges or other shapes) distributed around the exterior surface of the second carrier 13.

In other embodiments, there may be only one axial damper, positioned at one end of the second carrier 13. In further embodiments, one axial damper may be included at one end of the first carrier 12 (e.g. the right-hand end of first carrier 12 in FIG. 2), and another axial damper may be included at one end of the second carrier 13 (e.g. the left-hand end of the second carrier 13 in FIG. 3). The compression and/or extension of one or both of the dampers may contribute to damping and/or constraining relative movement of the second carrier 13 and the housing 1. In other embodiments, the first carrier 12 and the second carrier 13 may each be provided with two axial dampers to damp and/or constrain relative axial movement of the carriers 12, 13 and the housing 1.

Mounting the carriers 12, 13 on the housing 1 via dampers 6, 7 means that the carriers 12, 13 and all of the components that are mounted on them (including the bearing arrangements, the sealing arrangements 11, and the shaft 4) move relative to the housing 1, and have their movement relative to the housing 1 damped, substantially together. In particular, dampers 6, 7 damp the movement relative to the housing 1 of the bearing arrangements and the sealing arrangements 11 substantially identically. The dampers 6, 7 allow the flywheel 3 and shaft 4 to move relative to the housing 1 without allowing the flywheel 3 and shaft 4 to move significantly relative to the sealing arrangements 11.

Mounting the carriers 12, 13 on the housing via the dampers 6, 7 therefore allows seals to be maintained by the sealing arrangements 11. The common damping by the dampers 6, 7 of the movement of the carriers 12, 13, the bearing arrangements, the sealing arrangements 11 and the shaft 4 relative to the housing 1 allows the seals 10 and sealing fluid of the sealing arrangements 11 to remain substantially in contact with the shaft 4 during relative motion of the flywheel 3 and the housing 1. The dampers 6, 7 do not compromise the seals formed against the shaft 4 by the sealing arrangements 11, and therefore the dampers 6, 7 do not cause increased windage losses, and do not themselves necessitate the implementation of continual or continuous vacuum pumping of the chamber 1a.

As well as allowing effective seals to be maintained during relative motion of the flywheel 3 and the housing 1, moving the carriers 12, 13, the bearing arrangements, the sealing arrangements 11 and the shaft 4 substantially together relative to the housing 1 reduces damage caused to the sealing arrangements 11 by movement of the shaft 4.

In the illustrated examples, the first and second carriers 12, 13 are made of steel. This ensures that the carriers 12, 13 are sufficiently stiff that they do not flex when force is applied to them. The carriers 12, 13 will not, for example, substantially flex when a force is applied to one of the carriers by the shaft 4 (via a bearing arrangement) or by the housing 1 that causes the part of the carrier to which the force was applied to move. This stiffness ensures that the entire carrier moves substantially together, and therefore that a sealing arrangement 11 which is mounted on a given carrier will move substantially together with any bearing arrangements mounted further along the same carrier. As a consequence, the carrier, the bearing arrangement(s), the sealing arrangement and the shaft will all move substantially together.

In the illustrated embodiments, a passage 5 is provided through the first carrier 12. The passage 5 can be used for providing sealing fluid to the cavity in the sealing arrangement 11 mounted on the first carrier 12 (e.g. to fill the cavity initially or to top up the level of sealing fluid in the cavity). Fluid flowing through the passage 5 may enter the cavity in the sealing arrangement 11 through an inlet aperture in the outer wall of the cavity. In the illustrated example, this inlet aperture is near or at the bottom of the cavity, and the outlet aperture is at the top of the cavity, thus ensuring that the cavity is full of oil.

The passage 5 may also or alternatively provide fluid (e.g. via not-illustrated subsidiary passages) to the bearings 2 (if, for instance, the sealing fluid is an oil and therefore may serve as a lubricant). In cases where the sealing fluid for the cavity serves as a lubricant for the bearings 2, the fluid may be fed from a common fluid source (e.g. a common reservoir). The fluid may drain from the bearings 2 back to the fluid reservoir.

The illustrated passage 5 may be one of a number of passages through which sealing fluid (e.g. oil) may pass to reach the cavity. Multiple passages and multiple inlet apertures may for example be provided around the circumference of the first carrier, such that the multiple passages all lie in a plane which is approximately orthogonal to the longitudinal axis of the shaft 4.

In some embodiments (such as the illustrated embodiments), additional passages may be provided through the first carrier 12 spaced axially from one another along the first carrier 12. The additional passages may be arranged to provide fluid (such as lubricating oil) directly to the shaft 4 or the bearings 2 (through additional inlet apertures), while the passage 5 is arranged to deliver fluid to the sealing arrangement 11. The additional passages and passage 5 may be arranged to be fed from a common fluid source, so that the sealing arrangements 11, the bearings 2 and the shaft 4 are all fed with fluid from the same source (e.g. reservoir). In other examples, the different passages may be arranged to be fed from different sources, so that different types of fluid can be provided to the sealing arrangements 11, the bearings 2 and the shaft 4.

Additionally, in some examples, one or more passages through the first carrier 12 may serve as a drain for the sealing fluid. The one or more drain passages may allow sealing fluid to be drained from the cavity through one or more outlet apertures. The one or more outlet apertures of the cavity may be positioned approximately opposite the inlet aperture(s)—near or at the top of the cavity. Additional drain passages and additional outlet apertures may be provided to allow fluid to be drained from the bearings, the shaft, or both.

The passages through the first carrier 12 may allow the shaft 4 to be cooled (e.g. by the delivery of cooling fluid to the shaft 4). Cooling the shaft 4 may effect cooling of the flywheel 3, which may extend the durability or the operating envelope of the flywheel, for instance, by enabling the flywheel 3 to store more kinetic energy by allowing it to rotate to a higher speed. Cooling the flywheel 3 in this way may be advantageous in that it overcomes the problem of how to cool an object which is positioned in an evacuated chamber 1a, at or near vacuum pressure.

In some examples, the combination of the passage(s) 5 and drain passage(s) may enable a continual or continuous flow of sealing fluid to be provided through the cavity. Sealing fluid which is drained via the drain passage(s) may be directed to a reservoir of sealing fluid, such as the reservoir from which the sealing fluid was fed to the cavity. In this way, in a preferred embodiment, sealing fluid may be circulated from the reservoir through the passage(s) 5 and the inlet apertures to the sealing arrangement 11, and back to the reservoir through the outlet apertures and drain passages. A similar arrangement may enable a continual or continuous flow of fluid through the bearings 2 and/or past the shaft 4. In other embodiments, there may be a source of sealing fluid which is separate from the reservoir into which sealing fluid is drained.

As illustrated in FIGS. 1, 3 and 4, second carrier 13 is provided with a similar arrangement of passages which may enable fluid to be directed to the bearings 2, the sealing arrangement 11 and/or the shaft 4 by second carrier 13 in an analogous way to first carrier 12. In other embodiments, only one of the carriers 12, 13 may be provided with passages. Alternatively, it may be that neither of the carriers 12, 13 includes such passages.

The housing 1 may include an aperture via which a vacuum pump (not illustrated) may evacuate the chamber 1a to create (and/or maintain) the desired vacuum or near-vacuum conditions within the chamber 1a.

The flywheel apparatus described above may be suitable for use in a vehicle. In such cases, kinetic energy may be added to the flywheel 3 during periods of deceleration of the vehicle. Kinetic energy stored in the flywheel 3 may be used to drive the wheels of the vehicle, e.g. to cause positive acceleration of the vehicle.

Additionally or alternatively, if the vehicle is, for instance, a service, construction or off-road/off-highway vehicle such as a lorry, a backhoe loader, a wheel loader, an excavator, a dumper truck or similar, the kinetic energy of the flywheel 3 may be used to cause another part of the vehicle, such as a lifting arm, a mechanical shovel, a cab or a tail lift, to move. A return motion (e.g. under gravity) of the part may in some cases cause kinetic energy to be added to the flywheel 3.

When the flywheel 3 is used in a vehicle, the dampers 6, 7 may serve to damp relative motion of the flywheel 3 and the housing 1 caused by the vehicle accelerating or braking, cornering, travelling over rough terrain, or being loaded with cargo or other materials.

The flywheel apparatus may include further sealing arrangements, such as one or more sealing arrangements between the housing 1 and one or both of the carriers 12, 13. Such a further sealing arrangement may take the form of a ring, and may provide a seal between the housing 1 and a carrier to prevent ingress of fluids or other matter into the housing 1. Preferably this further sealing arrangement is formed from an elastomer, and preferably it is an O-ring. In particular, the further sealing arrangement may prevent ingress of fluids or other matter into the chamber 1a within housing 1. This further sealing arrangement may be particularly important when the radial damper(s) via which the given carrier is mounted on the housing 1 allow significant relative movement of the housing 1 and the carrier, since a damper itself does not necessarily provide an effective seal between housing 1 and a carrier (although, in some embodiments, one or more of the radial dampers 6 may act to seal the evacuated chamber 1a). The further sealing arrangement is arranged to tolerate greater relative axial and/or radial movement of the housing 1 and the carrier than the sealing arrangements 11 provided between the carriers 12, 13 and the shaft 4 can tolerate. As the further sealing arrangement is not rotating, its seals may be installed with greater interference than the seal that contacts the shaft 4, without a similar penalty of increased losses.

Although the illustrated bearings 2 are roller element-type (e.g. ball bearing-type) bearings, other types of bearing which allow the desired form of relative movement of the shaft and a carrier may also be used. For instance, other types of rolling-element bearings may be used, as may fluid bearings, magnetic bearings, or plain bearings.

Furthermore, although in the illustrated examples there are two bearings 2 per bearing arrangement and one bearing arrangement per carrier, there may be any number of bearings 2 per bearing arrangement and any number of bearing arrangements per carrier, including only one bearing per bearing arrangement, more than two bearings per bearing arrangement, and/or two or more bearing arrangements per carrier. This applies also to embodiments in which the shaft 4 is supported in a cantilevered arrangement, i.e. the shaft 4 is supported on only one side of the flywheel 3.

Although in the illustrated examples second carrier 13 was provided with radial and axial dampers and first carrier 12 was provided with radial dampers only, other examples may include radial dampers only for both the first carrier 12 and the second carrier 13, axial dampers only for both the first carrier 12 and the second carrier 13, radial and axial dampers for both carriers 12, 13, or no dampers for either carrier.

The illustrated examples include four radial dampers per carrier. However, in other examples, there may be any number of radial dampers per carrier, including no radial dampers per carrier and only one radial damper per carrier.

Some examples may include dampers which serve as both radial dampers and axial dampers, i.e. dampers which are able to damp relative movement of the flywheel 3 and the housing 1 in a direction along a radial line of the shaft 4 and relative movement of the flywheel 3 and the housing 1 in a direction substantially parallel to the axis of the shaft 4. In some of these examples, the dampers may for instance be mounted at one end or both ends of a carrier. One part of such a damper may extend in a direction substantially parallel to the axis of the shaft 4, along one (e.g. circumferential) outer surface of the carrier (i.e. the radially outer surface of the carrier), so that that part of the damper can provide radial damping. Another part of the damper may extend substantially orthogonally to the axis of the shaft 4, along a different (e.g. axial) outer surface of the carrier (i.e. the axially outer surface of the carrier), so that that part of the damper can provide axial damping.

It may be that only one form of carrier is manufactured, and that that one form of carrier can be fitted at either end of the shaft 4 on either side of the flywheel 3, i.e. that the one form of carrier is suitable for use as first carrier 12 or second carrier 13. First carrier 12 and second carrier 13 may therefore be identical in form. The arrangements of the first carrier 12 and the second carrier 13 may differ only in that the second carrier 13 is mounted on the housing 1 via radial dampers 6 and axial dampers 7, while first carrier 12 is mounted on the housing 1 via radial dampers 6 alone. Manufacturing only one form of carrier which can serve as either first or second carrier may make manufacturing the flywheel apparatus cheaper, since one carrier can be made in greater volume.

In some embodiments, one of the first and second carriers 12, 13 may not include a sealing arrangement 11, and the corresponding bearing arrangement may be mounted inside the evacuated chamber 1a of the housing 1. Advantageously this may reduce frictional losses in the flywheel apparatus, since it will reduce the number of components contacting the shaft 4. In other embodiments, there may be only one carrier. In such cases, the flywheel may be mounted in a cantilevered fashion, further reducing frictional losses in the flywheel apparatus. The one carrier may be provided with no dampers, radial dampers only, axial dampers only or both radial and axial dampers.

Some embodiments may allow some relative axial movement between the shaft 4 and a sealing arrangement 11 whilst constraining the shaft 4 and the sealing arrangement 11 to move radially substantially together. For example, a bearing arrangement may not be axially located within a carrier 12, 13, but there may be a good radial fit between the shaft 4 and the inner race 2a of a bearing within the bearing arrangement, and between the bearing outer race 2b and the carrier 12, 13, such that the carrier 12, 13 and the shaft 4 move radially substantially together. In such embodiments, a retaining ring and a shoulder of the carrier 12, 13 that (in other embodiments) might retain and locate the bearing arrangement axially in the carrier 12, 13, may be absent. Such embodiments may be suitable for a sealing arrangement 11 that is not tolerant of radial movement relative to the shaft 4, but which may be tolerant of some relative axial movement. For example, these embodiments may be suitable where the sealing arrangement 11 is a mechanical shaft seal, such as a labyrinth seal, in which a sealing cylindrical inner face of a seal is a close-tolerance sliding (and rotating) fit with the shaft 4 cylindrical outer surface. Where there is a fluid-filled cavity between two opposing mechanical shaft seals, fluid may still be effectively retained in the cavity.

Some embodiments may allow some relative radial movement between the shaft 4 and a sealing arrangement 11, whilst constraining the shaft 4 and the sealing arrangement 11 to move axially substantially together. For example, the outer race 2b of a bearing 2 within a bearing arrangement may be isolated from the internal cylindrical surface of the carrier by a 'radial' damper 6, but there may still be axial location of the bearing arrangement within the carrier 12, 13 (using a retaining clip and a shoulder of the carrier 12, 13, as described previously), such that the carrier 12, 13 and shaft 4 move axially substantially together. Such embodiments may be suitable for a sealing arrangement 11 that is not tolerant of axial movement relative to the shaft 4, but which may be tolerant of some radial relative movement.

The invention claimed is:

1. An apparatus comprising:
   a high speed flywheel mounted on a shaft;
   a housing for housing the flywheel, the housing arranged to hold at least a partial vacuum;
   a first carrier;
   a bearing arrangement; and
   a sealing arrangement, including two seals and a cavity defined in part between the seals, wherein the cavity extends circumferentially around the shaft, and wherein the cavity is at least partially filled with a sealing fluid and the seals are configured to retain the sealing fluid within the cavity whereby the sealing arrangement is arranged to enable at least a partial vacuum to be maintained within the housing;
   wherein the bearing arrangement and the sealing arrangement are mounted on the first carrier; the shaft is mounted on the first carrier via the bearing arrangement; and the first carrier is mounted on the housing; wherein the carrier, the sealing arrangement and the bearing arrangement are arranged to move substantially together, relative to the housing, in a radial direction and/or in a direction parallel to the axis of the shaft.

2. An apparatus as claimed in claim 1, wherein the first carrier, the bearing arrangement and the sealing arrangement are arranged to move substantially together with the shaft.

3. An apparatus as claimed in claim 1, wherein the apparatus is arranged such that relative movement of the housing and the flywheel causes the movement of the first carrier, the bearing arrangement and the sealing arrangement.

4. An apparatus as claimed in claim 1, wherein the apparatus is arranged to allow movement of the first carrier, the bearing arrangement and the sealing arrangement relative to the housing in a direction along a radial line of the shaft.

5. An apparatus as claimed in claim 1, wherein the apparatus is arranged to allow movement of the first carrier, the bearing arrangement and the sealing arrangement relative to the housing in a direction substantially parallel to a longitudinal axis of the shaft.

6. An apparatus as claimed in claim 1, additionally comprising a first damper for damping relative movement of the housing and the flywheel, wherein the first carrier is mounted on the housing via the first damper, and the first damper is arranged to damp relative movement of the housing and the first carrier, the bearing arrangement and the sealing arrangement.

7. An apparatus as claimed in claim 6, wherein the first damper is arranged to damp relative movement, in a direction along a radial line of the shaft, of the housing and the flywheel.

8. An apparatus as claimed in claim 6, wherein the first damper is arranged to damp relative movement in a direction substantially parallel to a longitudinal axis of the shaft of the housing and the flywheel.

9. An apparatus as claimed in claim 6, wherein the first damper comprises an elastomeric damper.

10. An apparatus as claimed in claim 6, wherein the first damper comprises a ring.

11. An apparatus as claimed in claim 10, wherein the axis of the ring is substantially parallel to the axis of the shaft.

12. An apparatus as claimed in claim 6, additionally comprising a second damper for damping relative movement of the flywheel and the housing.

13. An apparatus as claimed in claim 1, additionally comprising a second carrier, the second carrier being separated axially from the first carrier, on an opposite side of the flywheel.

14. An apparatus as claimed in claim 13, wherein the first carrier and the second carrier are each provided with at least one damper for damping relative movement of the flywheel and the housing in a direction along a radial line of the shaft, and wherein the second carrier is additionally provided with at least one damper for damping relative movement of the flywheel and the housing in a direction substantially parallel to the axis of the shaft.

15. An apparatus as claimed in claim 1, wherein a further sealing arrangement is provided between the carrier and the housing and is arranged to damp relative movement of the flywheel and the housing.

16. An apparatus as claimed in claim 15, wherein the further sealing arrangement is a static sealing arrangement.

17. An apparatus as claimed in claim 1, wherein the sealing arrangement is arranged to maintain a pressure difference of approximately 1 atmosphere between its two sides.

18. An apparatus as claimed in claim 1, wherein a seal is provided or formed between the carrier and an outer surface of the sealing arrangement.

19. An apparatus as claimed in claim 1 further comprising at least one flywheel contact surface and at least one housing contact surface, wherein the allowable movement of the carrier relative to the housing in a radial direction with respect to the shaft axis is less than the radial clearance between the flywheel contact surface and the housing contact surface.

20. An apparatus as claimed in claim 1 further comprising at least one flywheel contact surface and at least one housing contact surface, wherein the allowable movement of the carrier relative to the housing in an axial direction with respect to the shaft axis is less than the axial clearance between the flywheel contact surface and the housing contact surface.

* * * * *